R. H. CADENHEAD.
PLOW.
APPLICATION FILED DEC. 8, 1908.

926,544. Patented June 29, 1909.

Witnesses
Louis R. Heinrichs
Frank B. Hoffman

Inventor
Robert H. Cadenhead
By Victor J. Evans
Attorney

UNITED STATES PATENT OFFICE.

ROBERT H. CADENHEAD, OF COMANCHE, TEXAS.

PLOW.

No. 926,544.  Specification of Letters Patent.  Patented June 29, 1909.

Application filed December 8, 1908. Serial No. 466,522.

*To all whom it may concern:*

Be it known that I, ROBERT H. CADENHEAD, a citizen of the United States, residing at Comanche, in the county of Comanche and State of Texas, have invented new and useful Improvements in Plows, of which the following is a specification.

My invention relates to plows and particularly to that class embodying adjustable sweeps or blades and its object is to provide a plow whereby sweeps or blades of either of the standard sizes, viz., ten, twelve and fourteen inch may be easily adjusted and secured in adjusted position.

With this object in view, the invention consists in the construction and novel arrangement of parts as disclosed in the specification and particularly pointed out in the claim, and shown in the accompanying drawing, in which:—

Figure 1:
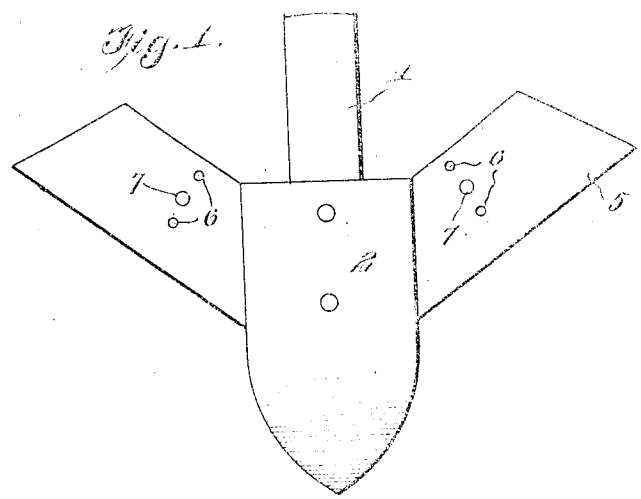
Figure 2:
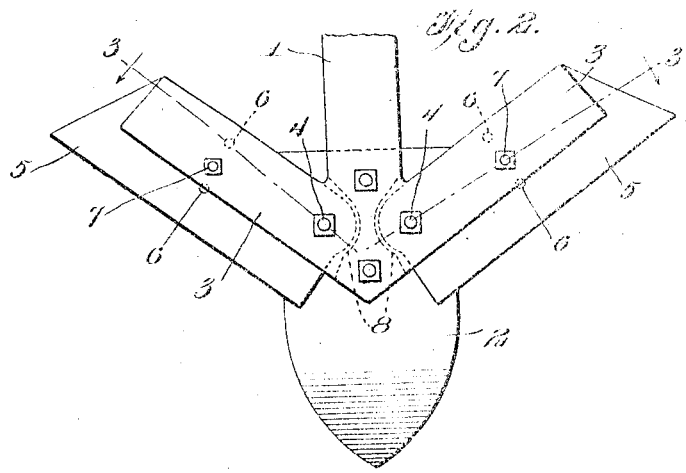
Figure 3:
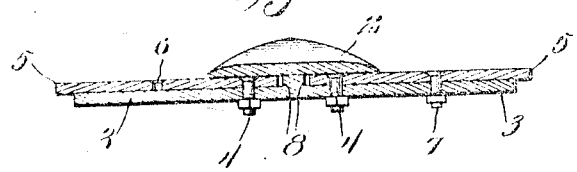

Figure 1 is a front elevation of a plow constructed in accordance with my invention. Fig. 2 is a rear elevation. Fig. 3 is a sectional view taken on the line 3—3 of Fig. 2.

Referring to the drawing, the numeral 1 designates the plow foot or standard to which is secured in the usual manner the plow 2. Formed integral with the foot 1 are two outstanding wings or members 3 to the inner end of which are pivoted as at 4, the sweeps or blades 5, said blades being provided at points equidistant from the pivot 4 with openings 6 for the reception of the securing bolts 7. The plow-foot is recessed as at 8 in order to bring the pivots 4 of the blades 5 to the most rigid portion of the wings 3.

From the foregoing description, it is obvious that the sweeps or blades 5 may be adjusted at different angles relative to the plow by means of the bolts 7 and apertures 6 and may be easily removed when worn or broken or when it is desired to substitute a blade of different size.

By providing the outstanding wings or members 3 it is obvious that in view of the fact that these wings or members support the knives or sweeps, the said knives or sweeps will be greatly reinforced and will be effectively held against accidental breakage when the plow is in use.

What I claim, is:—

A plow foot having a shovel at its lower end, outwardly extending wings carried by said foot and disposed at the lower end thereof, adjustable blades pivoted at their inner ends to the said wings and having their pivot points disposed immediately at the rear of said shovel, said blades each having a plurality of openings formed therein, and adjusting bolts carried by said wings adapted to be engaged in said openings to hold the blades in their adjusted positions.

In testimony whereof I affix my signature in presence of two witnesses.

ROBERT H. CADENHEAD.

Witnesses:
J. M. WHALEY,
OTIS HARVEY.